(12) United States Patent
Poovey

(10) Patent No.: US 7,486,848 B2
(45) Date of Patent: *Feb. 3, 2009

(54) LAYERED BENDING ELEMENT LIGHT SWITCH

(76) Inventor: Gary Neal Poovey, 28557 Lemon Ave., Escalon, CA (US) 95320

( * ) Notice: Subject to any disclaimer, the term of this patent is extended or adjusted under 35 U.S.C. 154(b) by 0 days.

This patent is subject to a terminal disclaimer.

(21) Appl. No.: 11/618,934

(22) Filed: Jan. 1, 2007

(65) Prior Publication Data

US 2008/0159690 A1 Jul. 3, 2008

(51) Int. Cl.
G02B 6/26 (2006.01)
G02B 6/42 (2006.01)

(52) U.S. Cl. .............................. 385/15; 385/16; 385/24; 385/32

(58) Field of Classification Search ........................ None
See application file for complete search history.

(56) References Cited

U.S. PATENT DOCUMENTS

| 5,703,995 | A | 12/1997 | Willbanks |
| 6,594,411 | B2 | 7/2003 | Chung |
| 7,072,536 | B2 | 7/2006 | Poovey |
| 7,283,698 | B2 * | 10/2007 | Poovey ........................ 385/15 |
| 2006/0045407 | A1 * | 3/2006 | Poovey .......................... 385/9 |
| 2006/0257064 | A1 * | 11/2006 | Trutna, Jr. ...................... 385/7 |

* cited by examiner

*Primary Examiner*—Sung Pak
*Assistant Examiner*—Chad H Smith

(57) ABSTRACT

A LAYERED BENDING ELEMENT LIGHT SWITCH will be used to turn on or off the light signal in one of two adjacent fiber optic channels by the action of the electric field of the light passing through the channels. LAYERED BENDING ELEMENT LIGHT SWITCH can be made adjacent to each other so that the bending elements will latch together and stay in the state required by means of the shape of the ends of the elements. The bending is accomplished by the response of piezoelectric material to the electric field of light in the fiber optic channel. This will allow information of be stored by the LAYERED BENDING ELEMENT LIGHT SWITCH that are made to latch. Light of different frequencies may travel in a light channel of appropriate dimensions together without hindering each other. The light that actuates the light switching or latching may be a different frequency than the light signal that is switched on or off. This switch holds the latched position required until light signals of the appropriate wavelength and power in the proper sequence are applied to the LAYERED BENDING ELEMENT LIGHT SWITCH to cause the unlatching.

39 Claims, 4 Drawing Sheets

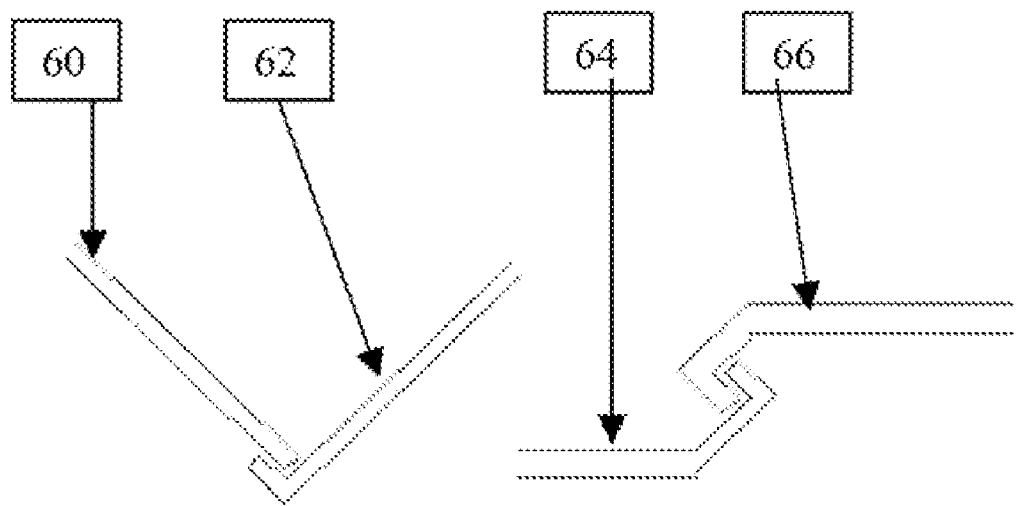
Figure 4 AFigure 4 B

LAYERED BENDING ELEMENT LIGHT SWITCH

BACKGROUND OF THE INVENTION

1. Field of the Invention

This invention relates to a method for switching light signals in an optical wave-guide on or off at speeds faster than $10^{-11}$ seconds using light to trigger the switch in which a layered element bends to close the channel. These switches can be arranged to stay latched until unlatched.

2. Description of the Prior Art

As technology advances communication of three-dimensional drawings, video, and software applications require more information to be communicated faster than ever. Fiber optical channels can handle much more information than wires can. The slowest part of a fiber optic communication channels at present are the fiber optic switching devices. At present fiber optic signals are switched using various methods that are actuated by transistors. U.S. Pat. No. 6,594,411 issued to Yueh Liang Chung et al, on Jul. 15, 2003, which teaches OPTICAL SWITCH, makes mention of a piezoelectric element. The piezoelectric element is actuated by an electrical signal, which is bound to the $10^{-9}$ seconds speeds that transistors can accomplish. U.S. Pat. No. 5,703,975 issued to William Miller et al, on Dec. 30, 1997 that teaches INTERFEROMETRIC SWITCH are physically long for the present need for miniaturized components. The components are more than a centimeter in length in William Miller's device. Finally, U.S. Pat. No. 7,072,536 issued to Gary Poovey on Jul. 4, 2006 which teaches LIGHT TRIGGERED LIGHT SWITCH, here included by reference, is as fast as the present invention because it is light triggered, but lacks the latching function.

SUMMARY OF THE INVENTION

LAYERED BENDING ELEMENT LIGHT SWITCH uses the inability of electromagnetic waves to travel through a channel that is dimensionally smaller than the wavelength to turn light off the light signal in a fiber optical channel. Opening up the fiber optical channel to a dimension large enough allows the LAYERED BENDING ELEMENT LIGHT SWITCH to turn on the signal in an optical channel. The LAYERED BENDING ELEMENT LIGHT SWITCH uses bending when exposed to a sufficient electric field of a element constructed of layers of different orientations of piezoelectric material to effect the closing or opening of fiber optical channels. The electric field of light in the channel is the electric field that effects the change in the piezoelectric material.

LAYERED BENDING ELEMENT LIGHT SWITCH can switch faster than $10^{-11}$ seconds. This is 100 times faster than any transistor-actuated switch. LAYERED BENDING ELEMENT LIGHT SWITCH can be made smaller than 30 microns in length, less than three microns in width, and high depending on the specific wavelength to be used in the fiber optic channel. Millions of these switches can be made in the area of one of the INTERFEROMETRIC SWITCH switches described above. LAYERED BENDING ELEMENT LIGHT SWITCH will also be 100 or more times faster than the INTERFEROMETRIC SWITCH. Fiber optic communication will be made 100 or more times faster using the LAYERED BENDING ELEMENT LIGHT SWITCHES and components will be able to be made the size of computer chip components. LAYERED BENDING ELEMENT LIGHT SWITCH can use the light in one light channel to switch on or off the light in an adjacent light channel. The amount of information that can be transmitted across a fiber optic channel is far greater than can be transmitted across a normal telephone wire. Society needs fast communication of sound pictures and video signals. Currently the switching of these communication signals is limited by the speed of the transistor. Which switches at about $10^{-9}$ seconds. For society to achieve fast switching of signals the LIGHT TRIGGERED LIGHT SWITCH, here included by reference, and the LAYERED BENDING ELEMENT LIGHT SWITCH are necessary. The LAYERED BENDING ELEMENT LIGHT SWITCHES can be built adjacent to each other so that the bending elements will lock or latch together. This latching function will open the door to computers that use light to process information. The latching can be used to store information and make memory devices. Computers that the LAYERED BENDING ELEMENT LIGHT SWITCH will make possible will be capable of functioning 100 times or more, faster than current computers. The multiple layers of the bending elements accentuate the bending. Two layers or just a few layers will respond the electric field, but the amount of action produced will not be as pronounced as in switches with more layers. The latching therefore of the multiple layered bending element switches will be faster and farther than a switch constructed of few layers.

BRIEF DESCRIPTION OF THE DRAWINGS

The electric field of the light in a channel parallel to the piezoelectric element causes the response of the piezoelectric material that shrinks the adjacent channel to dimensions too small to allow the light signal to pass through the channel. FIG. 1A is a drawing of the switch on and FIG. 1B is a drawing of the switch in the off position.

FIG. 3A is LAYERED BENDING ELEMENT LIGHT SWITCH arranged to latch in the unlatched state, and FIG. 3B is LAYERED BENDING ELEMENT LIGHT SWITCH arranged to latch in the latched state.

FIG. 4 is a detail of latching switch latches.

FIG. 4A is a latch for a right angle or near right LAYERED BENDING ELEMENT LIGHT SWITCH arranged to latch.

FIG. 4B is a latch for a straight angle or near straight.

Figure 1:
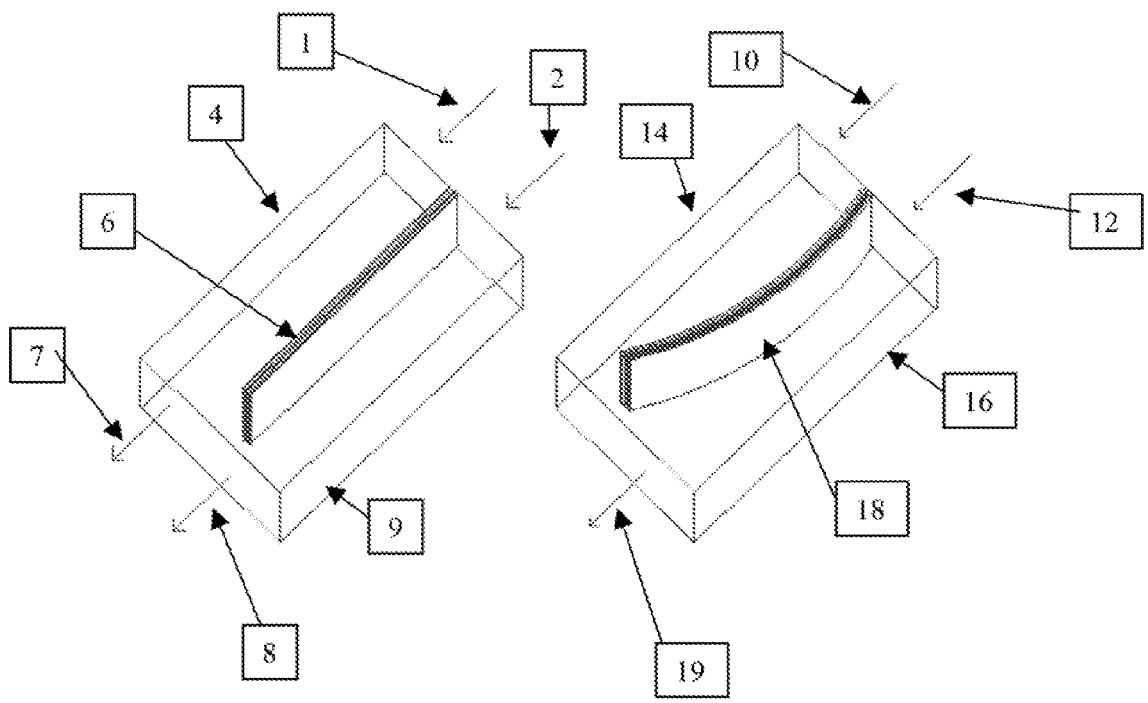
FIG. 1 is the LAYERED BENDING ELEMENT LIGHT SWITCH.

LAYERED BENDING ELEMENT LIGHT SWITCH arranged to latch LAYERED BENDING ELEMENT LIGHT SWITCH may be in channels of different dimensions so that different wavelengths of light can be used to actuate them. The widths of the channels may be slightly different or the height of the channels may be slightly different. Three or more Layered elements my be fashioned to latch together also for handling special signal management needs.

BEST MODE FOR CARRYING OUT THE INVENTION

The LAYERED BENDING ELEMENT LIGHT SWITCH uses the characteristic of piezoelectric material that the dimensions of the piezoelectric element change when it is influenced by an electric field. The electric field of light in a channel is the electric field that the piezoelectric material responds to in this invention. Light channels are arranged to be made larger or smaller as the piezoelectric materials change dimensions in responds to the influence of the electric field. When a light channel is opened up from being to small to allow light signals to pass though them by the response of the piezoelectric material to the electric field of light passing through the channel the switch is on. When the channel is made small enough, light signals of certain wavelengths will no longer pass through the smaller channel. When the light signals will not pass through the light channel that has been made smaller, the signal is switched off. Some piezoelectric materials have a crystal orientation that must be aligned with the electric field that will cause it to change shape.

Other piezoelectric materials can be heated up in a magnetic or electric field and oriented to respond in the desired direction to the electric field that will be applied.

In constructing LAYERED BENDING ELEMENT LIGHT SWITCHES, the piezoelectric elements will be constructed of layers.

One layer of the bending element will have a crystal orientation in opposition the adjacent layer of the piezoelectric element. These layers can be in one layer of material or layers with metal or other material between the piezoelectric material. There can be 2, 3, 4 . . . many layers involved. The layers alternate in orientation to accentuate the response to the electric field of the light applied to them. The electric field will cause the element to bend as these different orientations of piezoelectric material are affected by the electric field of the light in the channel. Many layers cause the response to be quicker and more pronounced than fewer layers.

Examples of piezoelectric materials that can be oriented in a magnetic or electric field are lead zirconate and lead titanate or lead zicronate titanate, also called PZT. For an example, the electric field in volts to be derived from the power in watts of the light in the channel from a form of the Poynting vector equation which is written $E=(2\mu_o \, c \, P)^{1/2}$. Where $\mu_o$ is $4 \, pi \times 10^{-7}$ Weber lamp-meter and c is $3 \times 10^8$ meters/second. Using this relation it is found that the voltage developed by a 150-milliwatt signal in a fourth of a micron channel is 10 volts. This voltage will be employed to actuate the Latching Fiber Optic Switch.

The voltage the light develops will change the dimensions of the 2065 Å channel by 40 Å when lead zecronate titnate is used. Lead zecronate titonate has a piezoelectric strain coefficient of $3.90 \times 10^{-10}$ meters/volt. 818 nm light (8180 Å) commonly used for fiber optics will be able to travel in a channel just bigger than 2045 Å and will not travel down a channel smaller. When the 2065 Å channel changes to 2014 Å light will be shut off of a wave length of 8180 Å or more, while light of a wave length of 8056 Å or less will still pass through. In the present invention, the switching mechanism is a bending piezoelectric element that bends in the presence of an electric field of appropriate orientation and power. Such an element is composed of layers with a flexible metallic film between the layers. The method for fabricating the bending element is as follows: First non-oriented piezoelectric layers are deposited on a substrate that can be a silicon wafer with a metal coating. Then channels are etched in the piezoelectric layer. The flexible metal film is deposited into the channels that were etched. The excess metal film is removed, and the piezoelectric layer is oriented in opposing directions in adjacent layers by opposite polarities in electric fields put on the metal between the layers. An element constructed in this fashion when an electric field of an appropriate light signal interacts with it will bend. As has been discussed if the element bends a sufficient distance the light channel will be closed to the passage of light signals.

Further, if tow or more such elements with ends that can latch are bent into a latched condition the light signal that can be tuned off and the latching switch will maintain the off condition once there is no light in the channel. A latched switch can be unlatched by the application of light in the proper sequence to bend the elements affecting an unlatching. The drawings illustrate the way the LAYERED BENDING ELEMENT LIGHT SWITCH and latching light switches function. In FIG. 1A, the arrow numbered 1 is the arrow that indicates the light moving trough the light channel into a LAYERED BENDING ELEMENT LIGHT SWITCH on one side.

The side that arrow 1 is going into is the on and off side of the light switch. Arrow 2 indicates the light moving through the LAYERED BENDING ELEMENT LIGHT SWITCH on the triggering side. Rectangular channel 4 is the on and off side of the LAYERED BENDING ELEMENT LIGHT SWITCH the side that the bending element bends toward.

Rectangular solid 6 is the straight bending element. The element is not being acted upon by the electric field of a switching signal that would be of sufficient power to cause the element to bend. Rectangular channel 9 is the side of the LAYERED BENDING ELEMENT LIGHT SWITCH that is away from the direction of the bend that the bending element can be caused to bend Arrow 7 is the light coming out of the LAYERED BENDING ELEMENT LIGHT SWITCH when the bending element is not bent. The switch is on in this position. Arrow 8 is the light coming out of the side away from the direction of the bend of the bending elements which can turn on or off the signal passing through the switch by the electric field of the light passing through switch.

In FIG. 1 B, arrow 10 is the light coming into the LAYERED BENDING ELEMENT LIGHT SWITCH that will be shut off by the closing of the channel by the bending element when it is bent. Arrow 12 is indicating the light entering the side away from the side that the bending element can bend into and shut off the light signal. The light indicated by arrow 12 is of sufficient power to actuate the switch.

Light channel 14 is the light channel that the bending element bends into to shut off the signal. Light channel 16 is the side of LAYERED BENDING ELEMENT LIGHT SWITCH away from the direction of the bending element. Bent element 18 is in the bent condition. No light is passing through the side of the switch that the bending element has moved into. The switch is in the off position. Arrow 19 is the light still passing through the side of the LAYERED BENDING ELEMENT LIGHT SWITCH that is away from the direction that the bending element bends to turn off the light signal.

Figure 2:
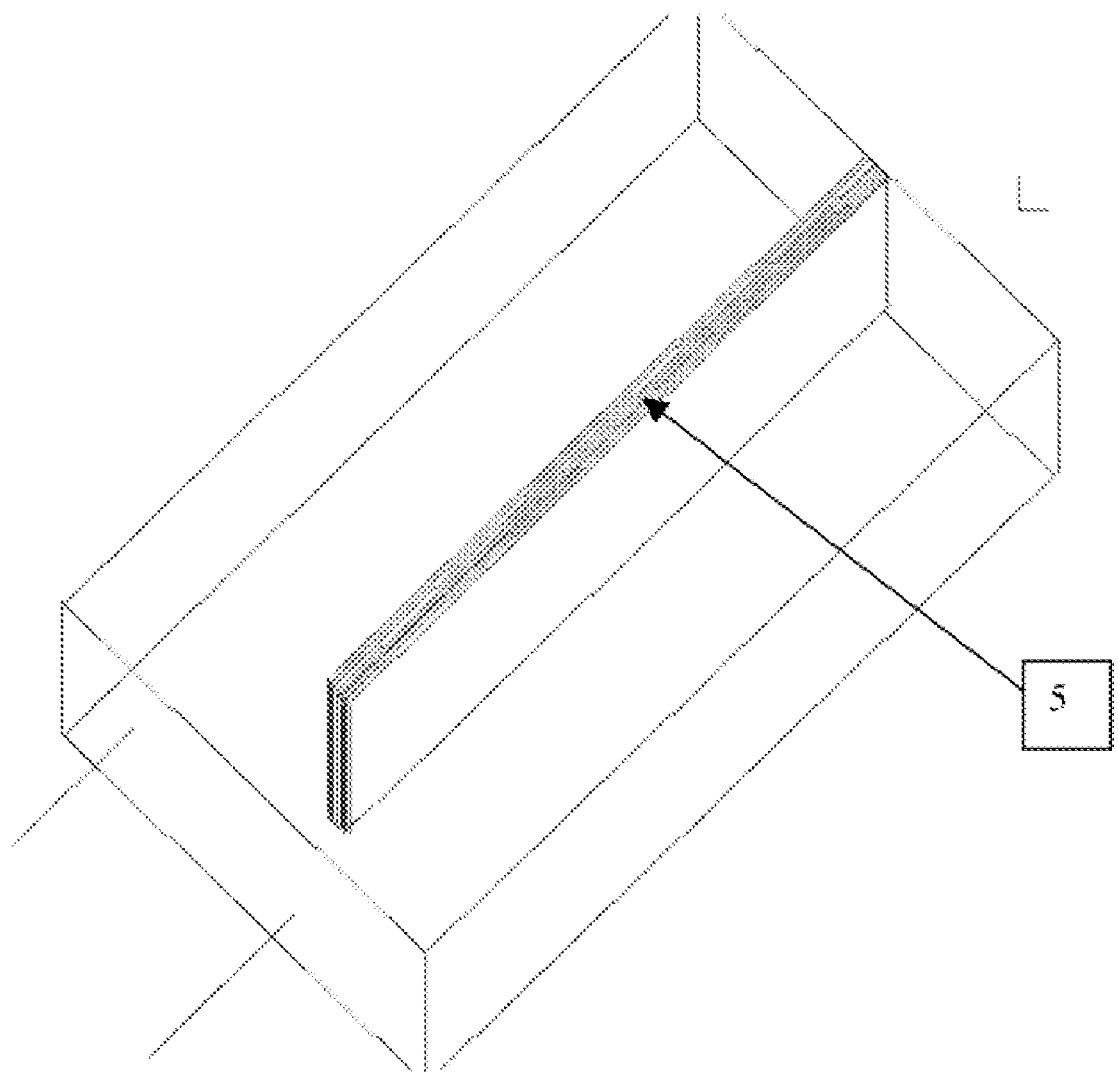
FIG. 2 shows the Layered Element constructed of many layers.

In FIG. 2 the layers of the pictured element are numbered 5. In a Layered Bending Element, the layers can be one layer of material with layers that are of different crystal orientations that force the element to bend when exposed to an electric field. There can be a layer of piezoelectric material attached to another material so that the assembly bends when exposed to an electric field. Bending Elements can be constructed of 2, 3, 4 . . . many layers with or with out metal between them.

These Layers have opposing orientations so that the layered Bending Element bends when exposed to an electric field. More layers cause the response to the electric field to be quicker and more pronounced than fewer layers.

Figure 3:
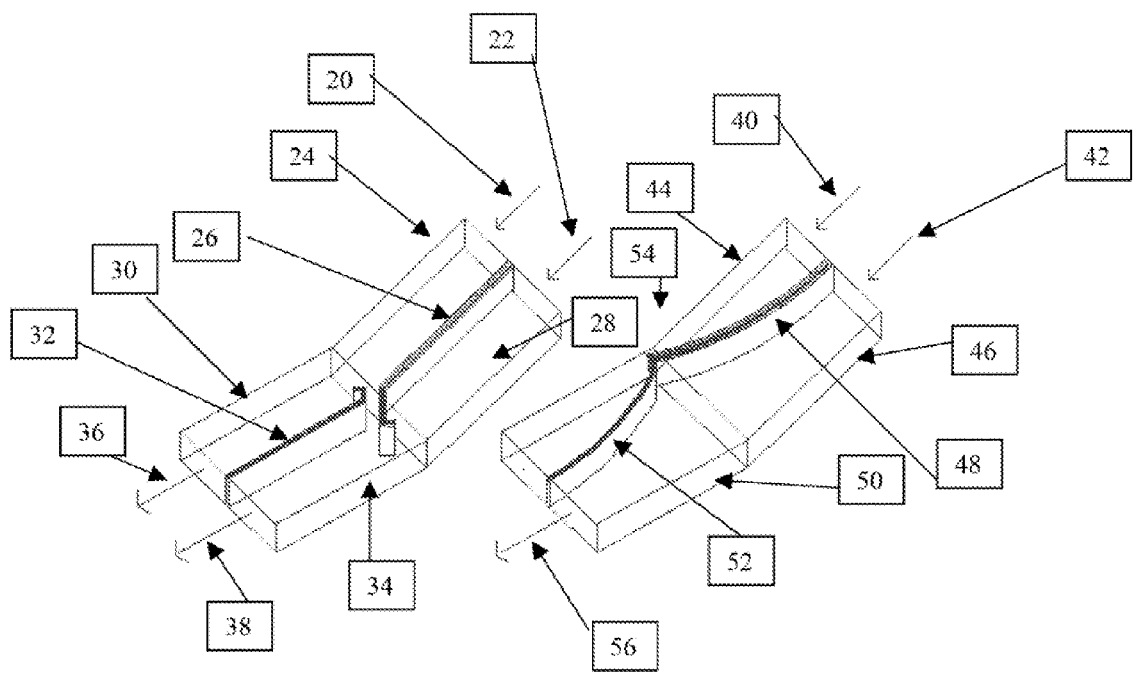
FIG. 3 is the two LAYERED BENDING ELEMENT LIGHT SWITCHES that are arranged to latch when actuated by the appropriate electric field. The electric field of light in light channels separated by piezoelectric elements causes the piezoelectric elements to bend into contact with each other. The ends of the piezoelectric elements are fashioned to catch on each other becoming latched together.

In FIG. 3A, Arrow 20 indicates the light passing into the side of the LAYERED BENDING ELEMENT LIGHT SWITCH that is constructed to allow the signal to be turned on or off if the latching elements are bent and latched. Arrow 22 indicates the light passing into the side away from the side of the LAYERED BENDING ELEMENT LIGHT SWITCH that the bending elements bend toward when they bend.

Rectangular channel 24 is the first side of the LAYERED BENDING ELEMENT LIGHT SWITCH on the side that the bending elements bend toward when they bend. Bend element 26 is the first half of the LAYERED BENDING ELEMENT LIGHT SWITCH that is bent and latched to shut off the light signal. Rectangular channel 28 is the side of the light channel that is away from the side that the bending element can bend toward and shut off the signal.

Rectangular channel 30 is the second half of the light channel on the side that the bending and latching elements can bend toward to latch and shut off the light from passing through the channel. Bending element 32 is the second half of the LAYERED BENDING ELEMENT LIGHT SWITCH that is not bent and latched so light can pass through. The switch is on. Rectangular channel 34 is the second half of LAYERED BENDING ELEMENT LIGHT SWITCH that is away from the side of the switch that the bending elements bend toward. Arrows 36 and 38 are the light passing of the side of the LAYERED BENDING ELEMENT LIGHT SWITCH.

In FIG. 3B, Arrow 40 is the light entering the LAYERED BENDING ELEMENT LIGHT SWITCH that is constructed to latch on the side that the light signal can be turned on or off when the elements bend and latch. This is the side toward which the bending elements bend, when they bend.

Rectangular light channel 44 is the first half of LAYERED BENDING ELEMENT LIGHT SWITCH that the bending element bends into this side of the switch when it bends. Arrow 42 is the light entering the LAYERED BENDING ELEMENT LIGHT SWITCH that has been constructed to latch on the side away from the direction that the bending element bends. Bending element 48 is the first element in the LAYERED BENDING ELEMENT LIGHT SWITCH that can latch. It is in the unbent state. The switch is in the on state. There is not sufficient power in the switching tight to cause the element to bend and latch. Rectangular channel 50 is the second half of the LAYERED BENDING ELEMENT LIGHT SWITCH that can latch away from the direction that the bending element will bend. The light in this side of the LAYERED BENDING ELEMENT LIGHT SWITCH that can latch will not be turned on or off by the bending of the elements. Rectangular light channel 54 is the second half of the channel in LAYERED BENDING ELEMENT LIGHT SWITCH that can latch that the bending elements bend into and causes the light signal to be tuned on or off by the bending of the latching elements. Bending element 52 is the second bending element that latches with bending element 48 when the switch is latched off. It is not bent.

There is enough power in the switching light to cause the element to bend and latch. The switch is in the off state.

Arrows 56 is the light passing out of the LAYERED BENDING ELEMENT LIGHT SWITCH, which is made to latch in the on state. It will be noted that there is no arrow indicating light is coming out of the switch on the side that the elements bend toward.

FIG. 4A is a drawing of two latching elements as they could be made to latch. Bending element 60 is one bending element that would be latched into position when caught by the other element of the pair numbered 62.

FIG. 4B is a drawing of two latching elements as they could be made to latch. Bending element 64 is one bending element that would be latched into position when caught by the other bending element of the pair number 66. Other latching shapes could be used to perform the desired function of latching once bent into position.

Some latching geometry's will work better for LAYERED BENDING ELEMENT LIGHT SWITCH that are arranged at right angles while others will be better used in a near straight angle configuration. Three or more Layered Elements may be fashioned to latch together for signal management for special applications. The four drawings of the LAYERED BENDING ELEMENT LIGHT SWITCH are schematic drawings. In actual switches, additional layers of material will be used to secure, cover, and align the fiber optic switches in a fiber optic assembly.

What I claim as my invention is:

1. An on and off switch for light in an optical wave guide, the on and off switch comprising:
   two parallel light channels; and
   a layered bending element between the two parallel light channels, the layered bending element comprises more than two layers of piezoelectric material that cause the layered bending element to bend in response to an electric field produced by a switching light that is applied to one of the two parallel light channels, wherein the layered bending element is configured relative to the two parallel light channels such that a light signal is:
   a) able to pass through one of the two parallel light channels when the switching light is not applied to one of the two parallel light channels; and
   b) not able to pass through one of the two parallel light channels when the switching light is applied to one of the two parallel light channels.

2. The on and off switch of claim 1 wherein the more than two layers of piezoelectric material have different crystal orientations.

3. The on and off switch of claim 1 wherein the more than two layers of piezoelectric material have opposing crystal orientations.

4. The on and off switch of claim 1 wherein the more than two layers of piezo electric material have crystal orientations that alternate from layer to layer.

5. The on and off switch of claim 1 further comprising means for maintaining, in the absence of the switching light, the shape of the layered bending element in a state that prevents the light signal from passing through one of the two parallel light channels.

6. An on and off switch for light in an optical wave guide, the on and off switch comprising:
   two parallel light channels;
   two layered bending elements between the two parallel light channels, the layered bending elements comprising more than two layers of piezoelectric material that cause the layered bending element to bend in response to an electric field produced by a switching light that is applied to one of the two parallel light channels, wherein the layered bending elements are configured relative to the two parallel light channels such that a light signal is:
   a) able to pass through one of the two parallel light channels when the switching light is not applied to one of the two parallel light channels; and
   b) not able to pass through one of the two parallel light channels when the switching light is applied to one of the two parallel light channels; and
   means for maintaining, in the absence of the switching light, the shape of the two layered bending elements in a state that prevents the light signal from passing through one of the two parallel light channels.

7. The on and off switch of claim 6 wherein the means for maintaining the shape of the two layered bending elements comprises a latch at one end of at least one of the two layered bending elements.

8. The on and off switch of claim 7 wherein the two layered bending elements are latched together at the latch in response to the switching light.

9. The on and off switch of claim 7 wherein the latch is configured such that once latched together, the two layered bending elements may be unlatched by applying light to the latched layered bending elements.

10. The on and off switch of claim 7 wherein the latch is configured such that once latched, the two layered bending elements may not be unlatched.

11. The on and off switch of claim 7 wherein, in response to the switching light, the layered bending elements meet at one of:
a) an acute angle to the latch;
b) a perpendicular angle to the latch; and
c) a straight angle to the latch.

12. The on and off switch of claim 6 wherein at least one of the layered bending elements comprises a hook on its end so that once bent by the electric field the layered bending elements latch in the bent state and do not unlatch once the electric field is gone.

13. The on and off switch of claim 6 wherein the more than two layers of piezoelectric material have different crystal orientations.

14. The on and off switch of claim 6 wherein the more than two layers of piezoelectric material have opposing crystal orientations.

15. The on and off switch of claim 6 wherein the more than two layers of piezo electric material have crystal orientations that alternate from layer to layer.

16. An on and off switch for light in an optical wave guide, the on and off switch comprising:
two parallel light channels; and
a layered bending element between the two parallel light channels, the layered bending element comprising more than two layers of piezoelectric material that cause the layered bending element to bend in response to an electric field produced by a switching light that is applied to one of the two parallel light channels;
wherein the layered bending element is configured relative to the two parallel light channels such that the on and off switch is a) on when the layered bending element is not bent; and b) off when the layered bending element is bent.

17. An on and off switch for light in an optical wave guide, the on and off switch comprising:
two parallel light channels;
two layered bending elements, each of the two layered bending elements comprising more than two layers of piezoelectric material that cause the respective layered bending element to bend in response to an electric field produced by a switching light that is applied to one of the two parallel light channels; and
means for latching the two layered bending elements together in response to the switching light;
wherein the layered bending elements are configured relative to the two parallel light channels such that the on and off switch is a) on when the layered bending elements are not latched together; and b) off when the layered bending elements are latched together.

18. A method for operating an optical switch, the method comprising:
applying a light signal to a signal channel that comprises a layered bending element, wherein the layered bending element comprises more than two layers of piezoelectric material;
applying a switching light to the layered bending element to change the shape of the layered bending element such that the light signal is prevented from passing through the signal channel; and
maintaining, in the absence of the switching light, the shape of the layered bending element in a state that prevents the light signal from passing through the signal channel.

19. The method of claim 18 wherein the more than two layers of piezo electric material have different crystal orientations.

20. The method of claim 18 wherein the more than two layers of piezoelectric material have opposing crystal orientations.

21. The method of claim 18 wherein the more than two layers of piezo electric material have crystal orientations that alternate from layer to layer.

22. The method of claim 18 wherein maintaining the shape of the layered bending element comprises latching the layered bending element in a bent state.

23. The method of claim 22 wherein latching the layered bending element in a bent state comprises latching the layered bending element to a second layered bending element.

24. The method of claim 18 wherein applying a switching light to the layered bending element comprises passing the switching light through a switching light channel.

25. The method of claim 24 wherein the switching light channel is formed in part by the layered bending element.

26. An optical switch comprising:
a switching light channel configured to guide a switching light;
a signal channel configured to guide a light signal;
a layered bending element between the switching light channel and the signal channel, wherein the layered bending element comprises more than two layers of piezoelectric material, wherein the shape of the layered bending element changes in response to application of the switching light to the switching light channel such that the light signal is prevented from passing through the signal channel.

27. The optical switch of claim 26 wherein the more than two layers of piezoelectric material have different crystal orientations.

28. The optical switch of claim 26 wherein the more than two layers of piezoelectric material have opposing crystal orientations.

29. The optical switch of claim 26 wherein the more than two layers of piezoelectric material have crystal orientations that alternate from layer to layer.

30. The optical switch of claim 26 further comprising means for maintaining, in the absence of the switching light in the switching light channel, the shape of the layered bending element in a state that prevents the light signal from passing through the signal channel.

31. The optical switch of claim 30 further comprising a second layered bending element between the switching light channel and the signal channel, wherein the means for maintaining the shape of the layered bending element comprises a latch at one end of at least one of the two layered bending elements.

32. The optical switch claim 31 wherein the two layered bending elements are latched together at the latch in response to the switching light.

33. An optical switch comprising:
- a switching light channel configured to guide a switching light;
- a signal channel configured to guide a light signal;
- two layered bending elements between the switching light channel and the signal channel, wherein each of the layered bending elements comprises more than two layers of piezoelectric material, wherein the shape of the layered bending elements changes in response to application of the switching light to the switching light channel such that the light signal is prevented from passing through the signal channel; and
- means for maintaining, in the absence of the switching light in the switching light channel, the shape of the layered bending elements in a state that prevents the light signal from passing through the signal channel.

34. The optical switch of claim 33 wherein the more than two layers of piezoelectric material have different crystal orientations.

35. The optical switch of claim 33 wherein the more than two layers of piezoelectric material have opposing crystal orientations.

36. The optical switch of claim 33 wherein the more than two layers of piezoelectric material have crystal orientations that alternate from layer to layer.

37. The optical switch of claim 29 wherein the means for maintaining the shape of the two layered bending elements comprises a latch at one end of at least one of the two layered bending elements.

38. The optical switch of claim 37 wherein the two layered bending elements are latched together at the latch in response to the switching light.

39. The optical switch of claim 33 wherein the two layered bending elements are latched together in response to the switching light.

* * * * *